United States Patent
Rune et al.

(10) Patent No.: US 10,980,002 B2
(45) Date of Patent: Apr. 13, 2021

(54) EXPLICIT CONFIGURATION OF PAGING AND CONTROL CHANNEL IN SYSTEM INFORMATION

(71) Applicant: Telefonaktiebolaget LM Ericsson (publ), Stockholm (SE)

(72) Inventors: Johan Rune, Lidingö (SE); Pål Frenger, Linköping (SE); Stefan Wager, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/475,892

(22) PCT Filed: Dec. 21, 2017

(86) PCT No.: PCT/IB2017/058292
§ 371 (c)(1),
(2) Date: Jul. 3, 2019

(87) PCT Pub. No.: WO2018/127764
PCT Pub. Date: Jul. 12, 2018

(65) Prior Publication Data
US 2019/0349891 A1    Nov. 14, 2019

Related U.S. Application Data

(60) Provisional application No. 62/443,407, filed on Jan. 6, 2017.

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0051* (2013.01); *H04L 5/10* (2013.01); *H04W 56/001* (2013.01); *H04W 68/005* (2013.01)

(58) Field of Classification Search
CPC ..................... H04W 56/001; H04W 68/005
See application file for complete search history.

(56) References Cited

U.S. PATENT DOCUMENTS 8,731,204 B2 * 5/2014 Sperschneider ...... G10L 19/008 381/22
2007/0206690 A1 * 9/2007 Sperschneider ...... G10L 19/008 375/260

(Continued)

FOREIGN PATENT DOCUMENTS

| GB | 2507548 A | 5/2014 |
| WO | 2015 020604 A1 | 2/2015 |
| WO | 2016 144222 A1 | 9/2016 |

OTHER PUBLICATIONS

PCT Notification of Transmittal of the International Search Report and the Written Opinion of the International Searching Authority, or the Declaration for International application No. PCT/IB2017/058292—dated Mar. 27, 2018.

(Continued)

*Primary Examiner* — Fahmida S Chowdhury
(74) *Attorney, Agent, or Firm* — Baker Botts, LLP

(57) ABSTRACT

In one embodiment, a method in a user equipment (UE) includes receiving broadcasted system information from a network node. The broadcasted system information may include explicit configuration information for a communications channel. The method further includes determining a configuration of the communications channel based, at least in part, on the explicit configuration information. The explicit configuration information may be used by the user equipment to override default channel configuration information. The method may further include receiving data over the communications channel.

20 Claims, 8 Drawing Sheets

(51) Int. Cl.
*H04L 5/10* (2006.01)
*H04W 56/00* (2009.01)
*H04W 68/00* (2009.01)

(56) References Cited

U.S. PATENT DOCUMENTS

| | | | |
|---|---|---|---|
| 2013/0301543 A1* | 11/2013 | Eriksson | H04W 72/042 |
| | | | 370/329 |
| 2014/0092877 A1* | 4/2014 | Kazmi | H04B 7/0689 |
| | | | 370/336 |
| 2014/0177562 A1 | 6/2014 | Li | |
| 2014/0307621 A1* | 10/2014 | Frenger | H04W 56/0025 |
| | | | 370/328 |
| 2016/0065338 A1* | 3/2016 | Kim | H04L 5/0048 |
| | | | 370/330 |
| 2016/0183308 A1* | 6/2016 | Eriksson | H04L 1/1854 |
| | | | 370/329 |
| 2017/0208516 A1* | 7/2017 | Kubota | H04W 72/0453 |

OTHER PUBLICATIONS

3GPP TSG-RAN WG2 NR Ad Hoc; Spokane, USA; Source: Ericsson; Title: Means and configuration of paging delivery in NR (Tdoc R2-1700550)—Jan. 17-19, 2017.
European Patent Office Examination Report in EP Application No. 17 832 353.1-1231, dated Dec. 9, 2020, 8 pages.

* cited by examiner

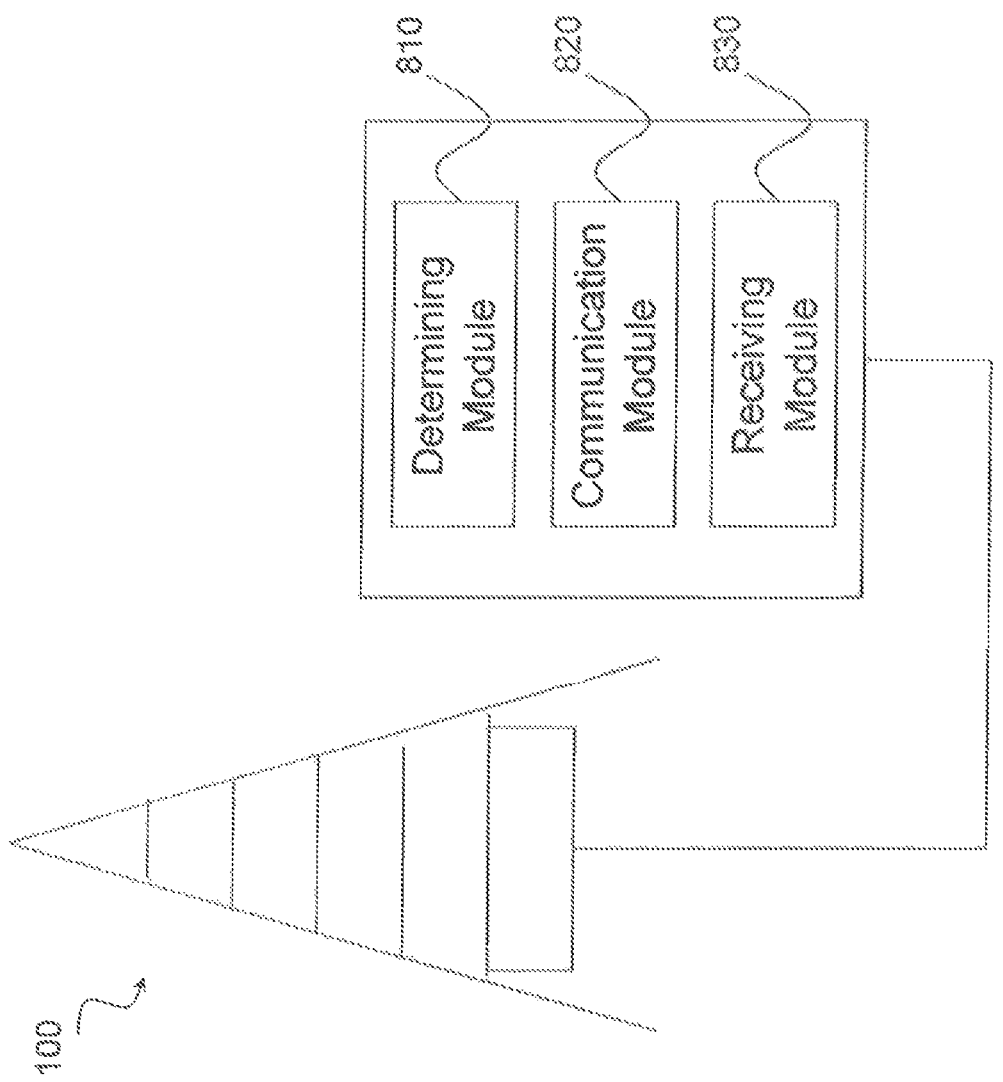

EXPLICIT CONFIGURATION OF PAGING AND CONTROL CHANNEL IN SYSTEM INFORMATION

PRIORITY

This nonprovisional application is a U.S. National Stage Filing under 35 U.S.C. § 371 of International Patent Application Serial No. PCT/IB2017/058292 filed Dec. 21, 2017 and entitled "Explicit Configuration of Paging and Control Channel in System Information" which claims priority to U.S. Provisional Patent Application No. 62/443,407 filed Jan. 6, 2017 both of which are hereby incorporated by reference in their entirety.

TECHNICAL FIELD

The present disclosure relates generally to wireless communications and, more specifically, to explicit configuration of paging and control channel in system information.

BACKGROUND

In LTE, each cell has its own downlink control channel, in the form of the PDCCH (physical downlink control channel), which is used to provide control information to UEs in both connected and idle mode. The PDCCH typically occupies the first 1, 2 or 3 OFDM symbols of each subframe. However, in alternative embodiments, such as 1.4 MHz bandwidth, it occupies the first 2, 3 or 4 OFDM symbols of each subframe. The PDCCH is configured by the PCFICH (Physical Control Format Indicator Channel), which is located in the first OFDM symbol of each subframe. Additional configuration information related to the PDCCH, such as scrambling and reference signal (e.g., cell-specific Reference Signal, CRS) to aid decoding, can be derived from the PCI, which in turn is indicated by the combination of the two synchronization signals PSS (primary synchronization signal) and SSS (secondary synchronization signal).

In addition, control information is also transmitted via the PDSCH (physical downlink shared channel), which is also present in each cell. The PDSCH is used for both user data and control data. The latter may be in the form of paging messages or system information messages, where the scheduling (e.g., DL resource allocation) is provided through DCI on the PDCCH. In addition to the DL resource allocation for the PDSCH provided by DCI on the PDCCH, the reference signals (e.g., CRS) enabling coherent decoding of the PDSCH can be derived from the PCI in the same way as for the PDCCH and the scrambling is derived from the RNTI which is encoded in the CRC of the DCI containing the scheduling assignment (e.g., the DL resource allocation).

The PDCCH and the PDSCH are always present in LTE in the sense that once a UE has identified (through the PCI derived from the PSS+SSS) and synchronized with a cell (where synchronization is also provided by the PSS+SSS), the UE can receive the PDCCH+PDSCH, aided by the CRS and PCFICH.

Paging and Other Downlink Control Signaling in New Radio

In New Radio or NR (the terms used to denote 3GPP's coming 5G radio access network) the means for delivery of paging is not yet specified.

Regarding delivery of system information (SI), it is agreed that the NR system information should consist of two main parts, namely: (1) the "minimum system information", which contains the information that is essential for accessing the system; and (2) "other system information", which contains the rest of the system information. The minimum SI is periodically broadcasted in a cell, whereas the other SI is either periodically broadcasted or provided on demand, for example, triggered by a random access preamble (indicated as SI-PRACH in FIG. 2) or a random access message 3 from a UE in idle or inactive (i.e. the "new state" agreed for NR) mode or requested via RRC signaling from a UE in connected mode. One proposed way of structuring the means for delivery of SI (in particular the minimum SI) in NR is depicted in FIG. 1 and FIG. 2. It should be noted that FIG. 1 and FIG. 2 depict examples of possible potential ways of structuring the means for delivery of SI and that other ways and means may also be possible and may turn out to be standardized and/or implemented.

In the example of FIG. 1 the NR-PSS/NR-SSS defines the Physical Cell Identity (PCI). A Master Information Block (MIB) is transmitted together with the NR-PSS/NR-SSS inside the NR Physical Broadcast Channel 1 (NR-PBCH1) (also referred to as Physical Broadcast Channel, PBCH). The PCI defines the NR cell. In case a cell transmits the synchronization signals in different beams during different time slots, then the MIB content may be different in different beams.

The MIB contains a limited amount of very essential information, including information on how the UE can receive SIB1 which in the example of FIG. 1 and FIG. 2 is broadcast on the second physical broadcast channel, herein denoted NR-PBCH$_2$. The MIB and SIB1 together form the minimum system information and thus, typically, the NR-PBCH$_1$ and NR-PBCH$_2$ contain all the essential system information to enable a UE to access the cell (i.e., the MIB and SIB1 in NR corresponds roughly to the MIB, SIB1 and large parts of SIB2 in LTE). In case some SI must be requested and transmitted on demand, SIB1 will contain the necessary configurations the UE needs.

Referring again to the example of FIG. 1 and FIG. 2, the SIB(s) broadcast on NR-PBCH$_2$ may be fully or partly relevant for multiple beams as well as multiple nodes/cells with different PCI (each with its own set of beams). This may be leveraged by jointly encoding and transmitting SIB configurations for multiple beams and/or nodes/cells on the NR-PBCH$_2$. Then it is not sufficient to only have one value tag (indicating the version of the system information) transmitted in the MIB. In addition to the system information value tag a system information index (denoted SI Index in FIG. 2) is introduced to distinguish which configuration to use in each beam or cell in case the NR-PBCH$_2$ contains system information relevant for more than one beam or cell.

As shown in FIG. 2, the PCI is signaled by the index of NR-PSS/NR-SSS. A MIB is signaled in a first broadcast channel denoted NR-PBCH1 and the periodically broadcasted SIBs are signaled in a second broadcast channel denoted NR-PBCH2. Additional information fields are not excluded.

FIG. 2 provides an example depicting some additional details related to the broadcasting of minimum SI in NR. Again, it is emphasized that other possible realizations of structuring of SI, including the minimum SI, and ways for delivery of the SI, are conceivable and may well eventually turn out to be chosen by 3GPP. The SS Block provides the PCI and the MIB. The MIB contains, for example, a valueTag, an SI index, and a configuration enabling the UE to receive the SIBs on NR-PBCH2.

The SI index may be interpreted as selecting which configuration in SIB2 that shall apply to each beam or different configurations of parameters in SIB1, e.g. in case some information corresponding to information in SIB2 in LTE is included in SIB1 in NR. This enables different beams to use different parameter configurations. A prime example may be that different beams may have different PRACH time slots and/or different PRACH preamble sequences.

The SI index may be used to enable different beams to use different SI without requiring that each beam transmits that SI explicitly. As beams become many and narrow the UE will stay for a short time in each beam before entering a new beam belonging to the same cell. When that happens, the UE must quickly acquire the SI associated with this new beam. If the UE already has a stored copy of that SI (identified by the SI index) it may immediately use that. The alternative would be that each beam transmits its own entire SI with a high periodicity which would be much more resource expensive compared to only transmitting a SI index, and would have a negative impact on the UE's SI acquisition delay, the UE and network energy consumption, the interference in the network and the overall system performance.

Different beams in a cell may thus transmit the same PCI but (partly) different SI with different timing and may have different relations to other channels, such as channels used for delivery of control signaling, including e.g. paging.

Furthermore, an alternative to beam sweeping for providing extending coverage is to use Single Frequency Network (SFN) transmission (i.e. simultaneous transmission of the same data from multiple synchronized TRPs) from multiple TRPs in the same and/or different cells, enabling the UE to receive the transmissions with increased SINR by combining the signals from the multiple TRPs. SFN transmission may be used for NR-PBCH$_2$, while the SS Block, including NR-PBCH$_1$ is transmitted separately, potentially using beam sweeping, by each TRP or cell. In the case of SFN transmission involving TRPs in multiple cells, these TRPs will thus transmit different PCIs (i.e. different NR-PSS/NR-SSS and thus different SS Blocks), but jointly transmit a common NR-PBCH$_2$ with the same SI (e.g. SIB1 and (possibly multiple indexed versions of) SIB2 or SIB1, e.g. if information more or less corresponding information in SIB2 in LTE is included in SIB1 in NR).

The situation for NR with regards to DL control channel and paging delivery is different than for LTE. There is no PDCCH/PDSCH configured for UEs in idle or inactive (i.e., the "new state" agreed in 3GPP, also known as RRC INACTIVE state) mode. In addition, there are no ever-present reference signals, like the CRS in LTE. Thus, the NR concept still lacks a channel for delivering paging (and possibly on-demand system information and/or Random Access Response) to UEs in idle (RRC IDLE) or inactive mode.

SUMMARY

To address the foregoing problems, according to one embodiment, a method in a network node includes broadcasting system information to a plurality of user equipments (UEs). The system information may comprise explicit configuration information for a communications channel, wherein the explicit configuration information overrides default channel configuration information. The method further includes transmitting data to one of the plurality of UEs using the communications channel.

According to an embodiment, a network node includes processing circuitry operably coupled to an interface. The processing circuitry is configured to determine a communications channel for delivering data to a plurality of user equipments (UEs). The interface may be configured to broadcast system information to the plurality of UEs. The system information may include explicit configuration information for the communications channel, the explicit configuration information overrides default channel configuration information. The interface may be further configured to transmit the data to one of the plurality of UEs using the communications channel.

In some embodiments, the explicit configuration information is broadcast in a master information block (MIB). In some embodiments, the explicit configuration information is broadcast in a system information block (SIB). In certain embodiments, the communications channel is a physical control channel.

In certain embodiments, the explicit configuration information comprises indication(s) of one or more of downlink transmission resources, a demodulation reference signal (DMRS) sequence, synchronization signal sequence, a communications channel search space definition, and a cyclic prefix length.

In some embodiments, the data is transmitted to the one of the plurality of UEs using at least one of: a single omnidirectional or sector beam transmission, repeated omnidirectional or sector beam transmissions, a sweeping of narrow beam transmissions, and a single frequency network transmission involving multiple transmission points.

Also disclosed is a method in a user equipment (UE). The method may include receiving broadcasted system information from a network node. The broadcasted system information may include explicit configuration information for a communications channel. The method further includes determining a configuration of the communications channel based, at least in part, on the explicit configuration information. The explicit configuration information may be used by the user equipment to override default channel configuration information. The method may further include receiving data over the communications channel.

Also disclosed is a user equipment (UE) comprising an interface and processing circuitry operably coupled to the interface. The interface may be configured to receive broadcasted system information from a network node. The broadcast system information may include explicit configuration information for a communications channel. The processing circuitry may be configured to determine a configuration of the communications channel based, at least in part, on the explicit configuration information, wherein the explicit configuration information overrides default channel configuration information. The interface may be further configured to receive data over the communications channel.

In some embodiments, the explicit configuration information is received in a master information block (MIB). In some embodiments, the explicit configuration information is received in a system information block (SIB). In some embodiments, the communications channel is a physical control channel.

In some embodiments, the UE is in an idle or inactive mode, and the received data is paging messaging. In some embodiments, the UE is in an idle or inactive mode, and the received data is on-demand system information.

In some embodiments, the explicit configuration information comprises one or more indication(s) of downlink transmission resources. In some embodiments, the explicit configuration information comprises one or more indications of a demodulation reference signal (DMRS) sequence. In some embodiments, the explicit configuration information comprises one or more indications of one or more synchronization signal sequence(s). In some embodiments, the explicit configuration information comprises an indication of a communications channel search space definition. In some embodiments, the explicit configuration information comprises an indication of a cyclic prefix length.

Certain embodiments of the present disclosure may provide one or more technical advantages. For example, by allowing for more idle and inactive mode control channels than what can be derived from the PCI, certain embodiments can optimize the coverage area of different messages in idle mode. This allows advantageous Single Frequency Network (SFN) transmission as well as single point transmission, but it also enables more flexible configurations.

For example, in certain embodiments several transmission points may share the same PCI (which would be beneficial in a C-RAN type of deployment), but there may be a need to transmit certain messages (e.g., paging messages) from a small sub-set of the transmission points. Defining one or more control channel(s) for an idle and/or inactive UE to monitor allows for the performance of precision paging in narrow beams to UEs that are known a priori to be stationary. Additionally, on demand system information can also be transmitted over a smaller area than the area of the NR-PSS/NR-SSS (which defines the PCI). This may provide a number of benefits, for example, to be used to beamform parts of the system information to users that request additional SI.

A third example of messages benefiting from an explicitly configured control channel (e.g., not derived from the PCI) is random access response (RAR) messages. Typically, the network has some knowledge of the position of the UE when sending the RAR and by using a control channel not derived from the PCI we enable the network to utilize this knowledge (e.g., by beamforming the RAR in the direction of the received random access preamble that is, beamforming the RAR in the opposite direction of the direction of arrival of the random access preamble. In heterogeneous deployments (with a macro node and one or more micro or pico nodes inside the macro node coverage) the idle or inactive mode messages (e.g. paging, on demand SI, RAR) may be transmitted from micro or pico nodes that are not participating in any PCI-related transmissions (such as NR-PSS/NR-SSS/NR-PBCH1).

The above described flexibility is advantageous, but sometimes the plain PCI derivation of the channel configuration may suffice. By keeping PCI derivation as the default channel configuration mechanism, an operator is able to choose to use the lightweight PCI derivation mechanism in deployment cases where this straightforward, but inflexible, channel configuration suffices. However, the ability to use these new, flexible embodiments will be available in other situations where any one of these advantages is desirable. Other advantages may be readily available and certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 8 is a schematic block diagram of an exemplary network node, in accordance with certain embodiments.

DETAILED DESCRIPTION

As described above, in NR there exists a need for downlink control channel and paging delivery. NR currently lacks a channel for delivering paging and other system information to UEs operating in certain modes. To overcome these and other issues, embodiments of the present disclosure utilize configuration information for one or more physical control channel(s) that is explicitly provided in broadcasted system information.

Certain embodiments may be differentiated from LTE in that, in LTE the UE first finds the physical control channel implicitly by detecting the PCI, and then uses this control channel to read the broadcasted system information. The various embodiments disclosed herein may provide the UE with information on demodulation reference signal (DMRS) sequence and resource element set; time synchronization reference signal; physical resources in time/frequency/code domains to monitor; and control channel search space definition. Embodiments of the present disclosure are described in greater detail in regard to FIGS. 3-8.

Figure 3:
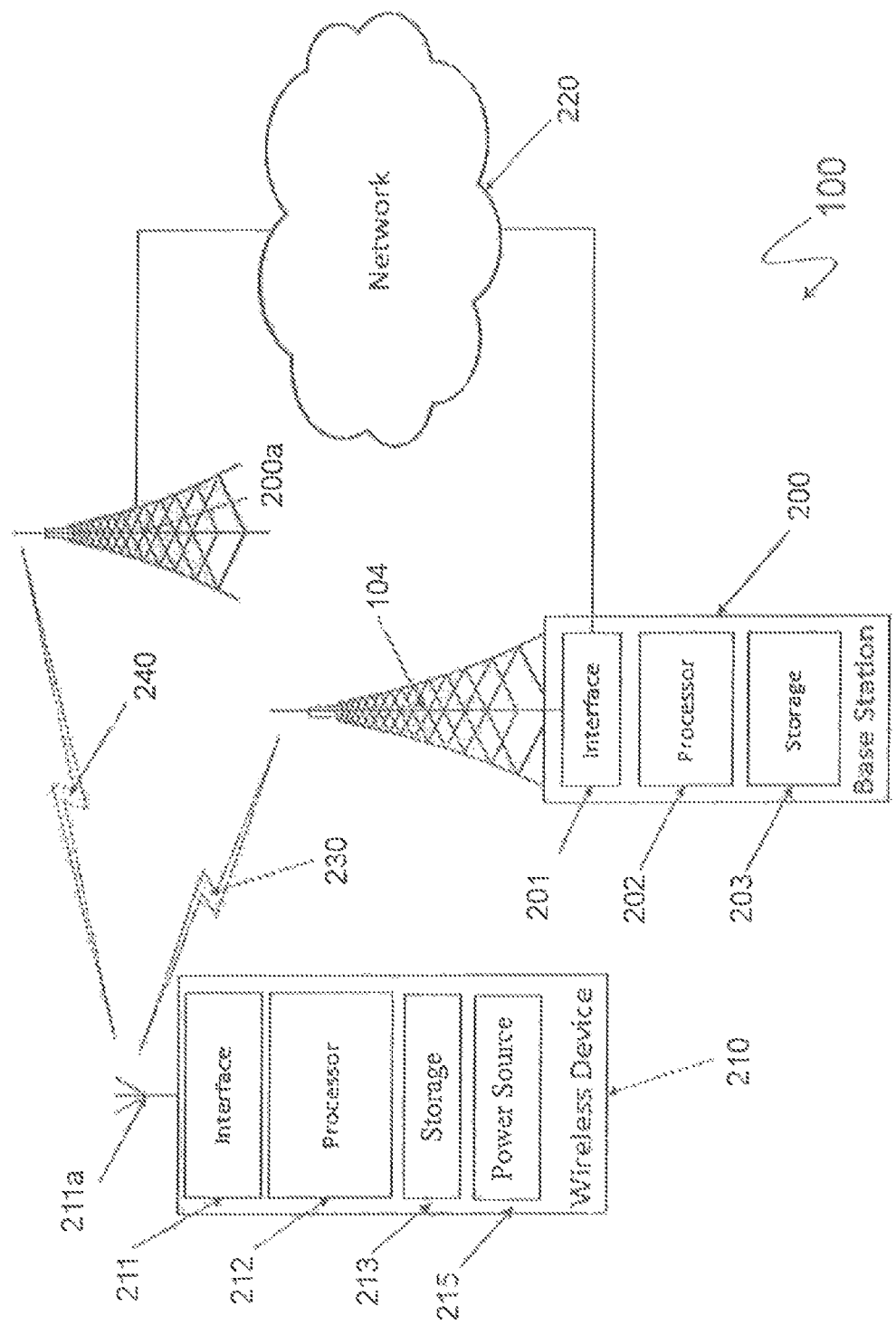
FIG. 3 is a schematic diagram of a wireless communication network, in accordance with certain embodiments.

FIG. 3 is a schematic diagram of a wireless communication network 100, in accordance with certain embodiments. In the example embodiment of FIG. 3, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

In the illustrated embodiment, FIG. 3 includes network 220, network nodes 200 (network node 200a may be referenced generally as "network node 200"), and wireless device 210. Wireless device 210 may be interchangeably referred to as user equipment (UE) 210. In different embodiments, the wireless network may comprise any number of wired or wireless networks, network nodes, base stations (B S), controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Although described primarily in terms of NR or 5G technology, the wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards (such as the New Radio, NR, 5G standard being specified by 3GPP); wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Figure 1:
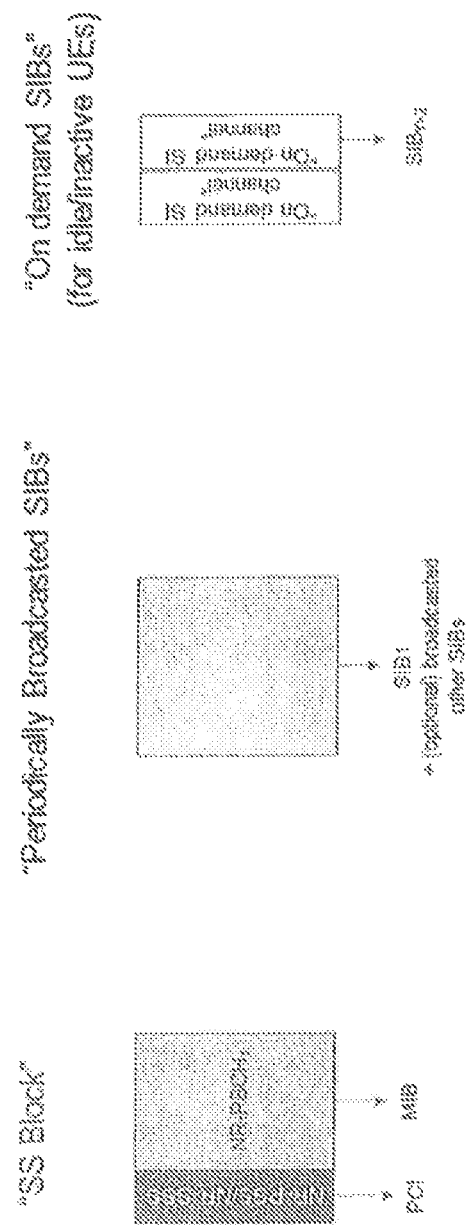
FIG. 1 illustrates a schematic overview for NR system information distribution, according to certain embodiments.
Figure 2:
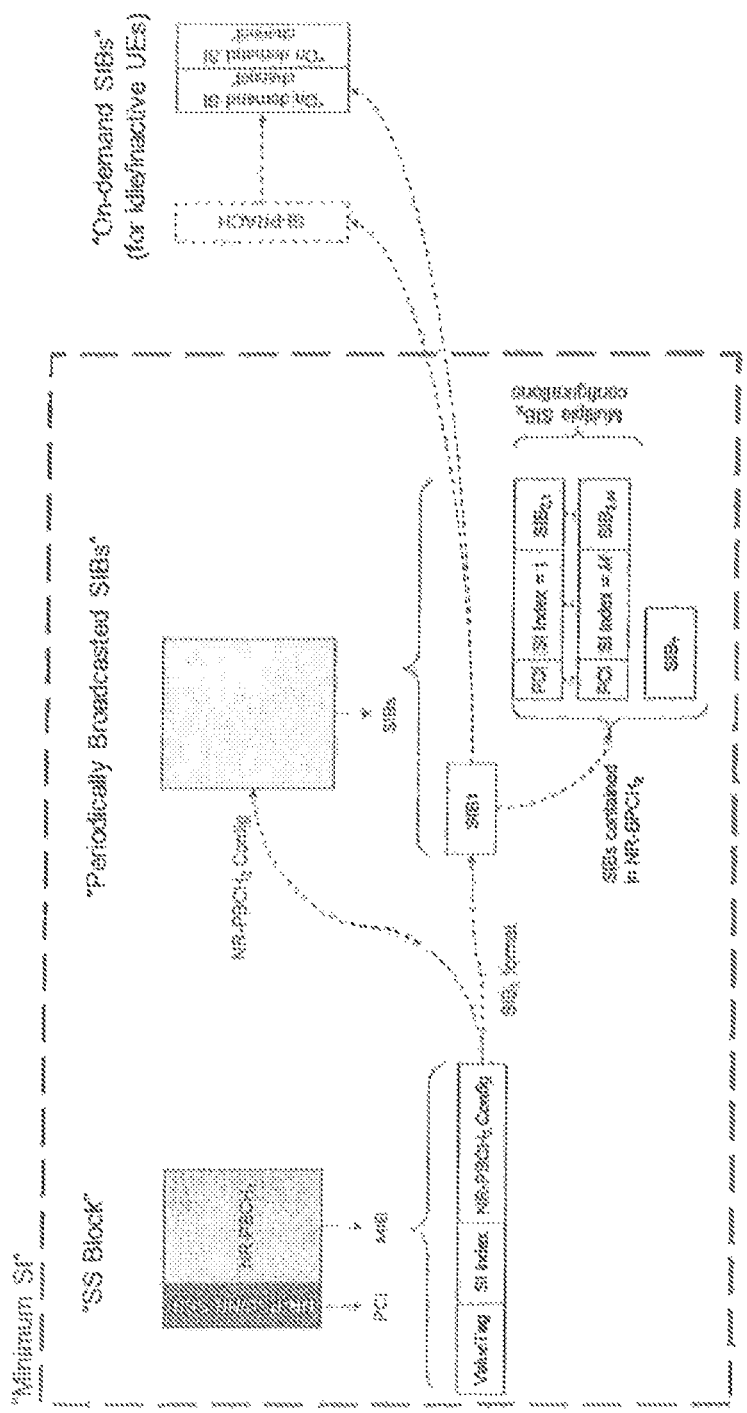
FIG. 2 illustrates an example schematic of a proposed structure of the minimum system information, according to certain embodiments.

FIG. 3 illustrates a wireless network 100 comprising a more detailed view of network node 200 and wireless device 210, in accordance with a particular embodiment. For simplicity, FIG. 2 only depicts network 220, network nodes 200 and 200a, and wireless device 210. Network node 200 comprises processor 202, storage 203, interface 201, and antenna 201a. Similarly, wireless device 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS). Yet another example of a radio base station is a 5G/NR radio base station, denoted gNodeB, or gNB, which may be implemented as a single integrated entity, possibly with a remote antenna unit, or split into a Central Unit (CU) and one or more Distributed Unit(s) (DU(s)), where the DU(s) is/are responsible for the delay sensitive functionality (e.g., functionality which is subject to specific timing requirements related to the radio interface), while the CU is responsible for the non-delay sensitive or less delay sensitive functionality.

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 3, network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as wireless device 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or wireless device 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or wireless devices via a wireless connection. The radio may convert the digital data into a radio signal having the appropriate channel and bandwidth parameters. The radio signal may then be transmitted via antenna 201a to the appropriate recipient (e.g., wireless device 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 3, wireless device 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other wireless devices. Wireless device 210 comprises interface 211, antenna 211a, processor 212, storage 213, and power source 215. Like network node 200, the components of wireless device 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Interface 211 may be used in the wireless communication of signalling and/or data between wireless device 210 and network node 200. For example, interface 211 may perform any formatting, coding, or translating that may be needed to allow wireless device 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 210 components, such as storage 213, wireless device 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by wireless device 210. Storage 213 may be used to store any calculations made by processor 212 and/or any data received via interface 211.

Power source 115 may comprise power management circuitry. Power source 115 may receive power from a power supply, which may either be comprised in, or be external to, power source 115. For example, wireless device 210 may comprise a power supply in the form of a battery or battery pack, which is connected to, or integrated in, power source 115. Other types of power sources, such as photovoltaic devices, may also be used. As a further example, wireless device 210 may be connectable to an external power supply (such as an electricity outlet) via an input circuitry or interface such as an electrical cable, whereby the external power supply supplies power to power source 115. Power source 115 may be electrically coupled to interface 111, processor 112, storage 113, and be configured to supply wireless device 210 with power for performing the functionality described herein.

Figure 4:
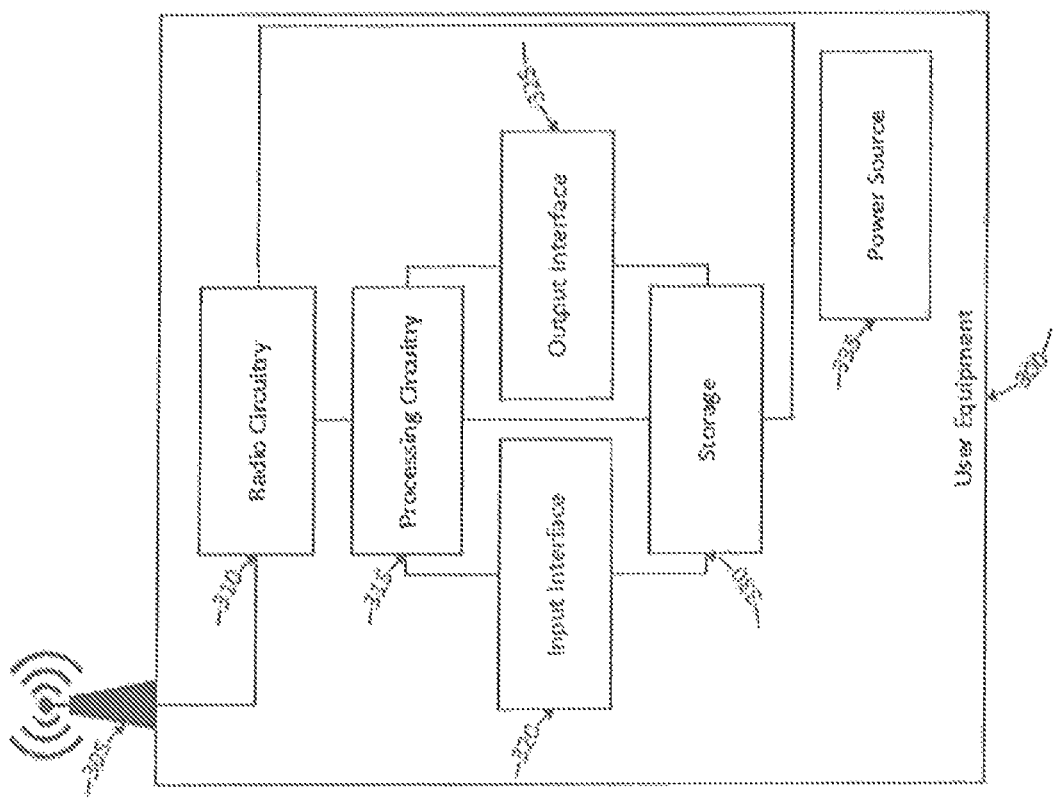
FIG. 4 is a schematic diagram of a user equipment as an example wireless device, in accordance with certain embodiments.

FIG. 4 is a schematic diagram of a user equipment 300 as an example wireless device, in accordance with certain embodiments. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 3 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, WiFi, or Bluetooth wireless technologies. These wireless technologies may be integrated into the same or different chipsets and other components within wireless device 300.

Configuration Information for Wireless Devices

Embodiments of the present disclosure describe how the configuration of one or more physical control channels may be explicitly provided in system information broadcasted to wireless devices 210.

In certain embodiments, a physical control channel for delivering data (e.g., paging messages) may be designed as a PDCCH/PDSCH-like structure. This may be beneficial, for example, if the data has variable sizes. Such a channel structure may be referred to as NR-PDCCH or NR-PDSCH. Relevantly, a straightforward copying of the PDCCH/PDSCH configuration principles of LTE would not be suitable for the flexible delivery requirements of NR. For example, NR supports higher frequency bands.

At least four different delivery modes may be supported in NR:
  A single omnidirectional or wide (e.g. sector) beam transmission;
  Repeated omnidirectional or wide beam transmissions with combining in UEs receiving at the coverage edge;
  Sweeping of narrow beams—a beam sweep may include a set of narrow beams, wherein the signal is transmitted in one of the beams at a time and each of the beams has a separate direction, so that the beams in the combined set cover the entire intended coverage area, for example, a cell; and
  Single Frequency Network transmission involving multiple TRPs in the same cell and/or different cells.

Each of these delivery methods may be applicable in different scenarios and may have different advantages and drawbacks. For example, in low frequency bands omnidirectional or wide beam transmission is a straightforward delivery method without any specific drawbacks. In higher frequencies, sweeping of narrow beams may be used, but disadvantages of this approach include large overhead and increased DRX active/wake time for the wireless device 210 to monitor the paging channel, or other control channel, since it does not know which beam(s) in the sweep it can receive. In certain embodiments, an alternative could be to use omnidirectional or wide beam transmission with repetition to allow accumulation of multiple receptions for wireless devices 210 at the cell/coverage edge. The number of repetitions needed to provide coverage at the cell edge depend on the deployment density, that is, the cell sizes and inter-site distances, and the applied modulation and coding.

Yet another way to improve the link budget is to use SFN transmission from synchronized transmission points, serving the same or different cells. The use of SFN transmission involving TRPs in multiple cells prevents derivation of the configuration of NR-PDCCH/NR-PDSCH from the PCI (NR-PSS/NR-SSS), since different cells (which may take part in the joint SFN transmission) transmit different PCIs. Another argument for using another means for configuration than derivation from PCI is that additional information that cannot suitably be derived from the PCI may be beneficial to provide. This may, for example, be a control resource set or information related to beam sweeping of the NR-PDCCH+NR-PDSCH (e.g., timing and/or number of beams in the sweep), which may facilitate monitoring and reception for the wireless device 210.

Based on the various delivery modes supported in NR, embodiments of the present disclosure may replace the implicit configuration derived from the PCI with explicit configuration of the NR-PDCCH/NR-PDSCH provided via system information. In certain embodiments, this explicit configuration information could be provided in either the minimum SI or the other SI and in any one of the above described parts/channels—the NR-PBCH, the channel used for delivery of SIB1, or the channel used for on demand delivery of other SI. For example, certain embodiments include the NR-PDCCH/NR-PDSCH configuration information in the minimum SI delivered on the channel configured at least in part in the MIB.

According to particular embodiments, a compact way of encoding and providing the explicit configuration information is in the form of a bit string of the same size (i.e., number of bits) as the PCI, which could be used in the same manner (e.g., using the same algorithm) as the PCI to derive a configuration for the NR-PDCCH/NR-PDSCH. If more configuration variants are desired than can be encoded in the number of bits of a PCI, in certain embodiments, the derivation algorithm could be designed to use a bit string of N bits as input, where N=MPCI+K, where MPCI is the number of bits in a PCI and K is an integer chosen to allow encoding of the desired number of configuration variants. When the PCI is used as input for derivation of the default configuration, the K extra bits could all be set to zero.

The configuration information for the NR-PDCCH/NR-PDSCH may include any suitable information. Non-limiting examples of the configuration information include DL transmission resources (e.g. time/frequency/code resources); DMRS; scrambling, a synchronization signal sequence; cyclic prefix length (e.g., an extended CP length in the case of SFN transmission of the NR-PDCCH+NR-PDSCH); control channel search space definition; and/or beam sweep information (e.g., information about timing and/or number of beams).

In some embodiments, a synchronization signal may be transmitted in conjunction with, or integrated with, the NR-PDCCH/NR-PDSCH. This may make the transmissions "self-contained" in that the wireless device 210 can detect it and decode it without aid from any other transmissions or channels. This may be beneficial, for example, when a UE has been in DRX sleep mode a relatively long time and has to receive the NR-PSS/NR-SSS before receiving the paging channel. If a synchronization signal is transmitted in conjunction with, or integrated with, the NR-PDCCH/NR-PDSCH, the UE does have to receive the NR-PSS/NR-SSS before receiving the paging channel. This may be particularly advantageous when the transmissions of NR-PSS/NR-SSS are sparse for energy saving purposes and/or when the NR-PDCCH/NR-PDSCH is transmitted (and the wireless device's 210 paging occasions occur) relatively far from the NR-PSS/NR-SSS in time. Such a synchronization signal may be provided as a synchronization component integrated with the reference signal used for decoding and channel estimation, for example, the DMRS.

In certain embodiments, once a communications channel is configured, for example, a physical control channel for paging, the channel may be considered for the delivery of other data to wireless devices 210. Such data could be on-demand triggered broadcast of other system information (e.g., system information that is not included in the periodically broadcast minimum system information). The channel may have a "two-channel" structure, like the PDCCH/PDSCH allowing the channel to be a generic channel for delivery of control information to wireless devices 210 in idle mode or in the "new state" defined for NR.

Providing explicit (and thus flexible) configuration of the NR-PDCCH+NR-PDSCH is advantageous for at least the reasons discussed above. However, in certain embodiments, it may be beneficial to derive the configuration from the PCI. This method has the advantage that it is a straightforward and lightweight mechanism, which does not add any explicit configuration information to the system information. To be able to take advantage of the benefits of both these methods (explicit and implicit) for configuration of the NR-PDCCH+NR-PDSCH, in certain embodiments, a default configuration can be derived from the PCI, but which may be overridden by optional explicit configuration information provided via the system information, preferably broadcasted with the minimum SI on the channel used for broadcast of SIB1.

Figure 5:
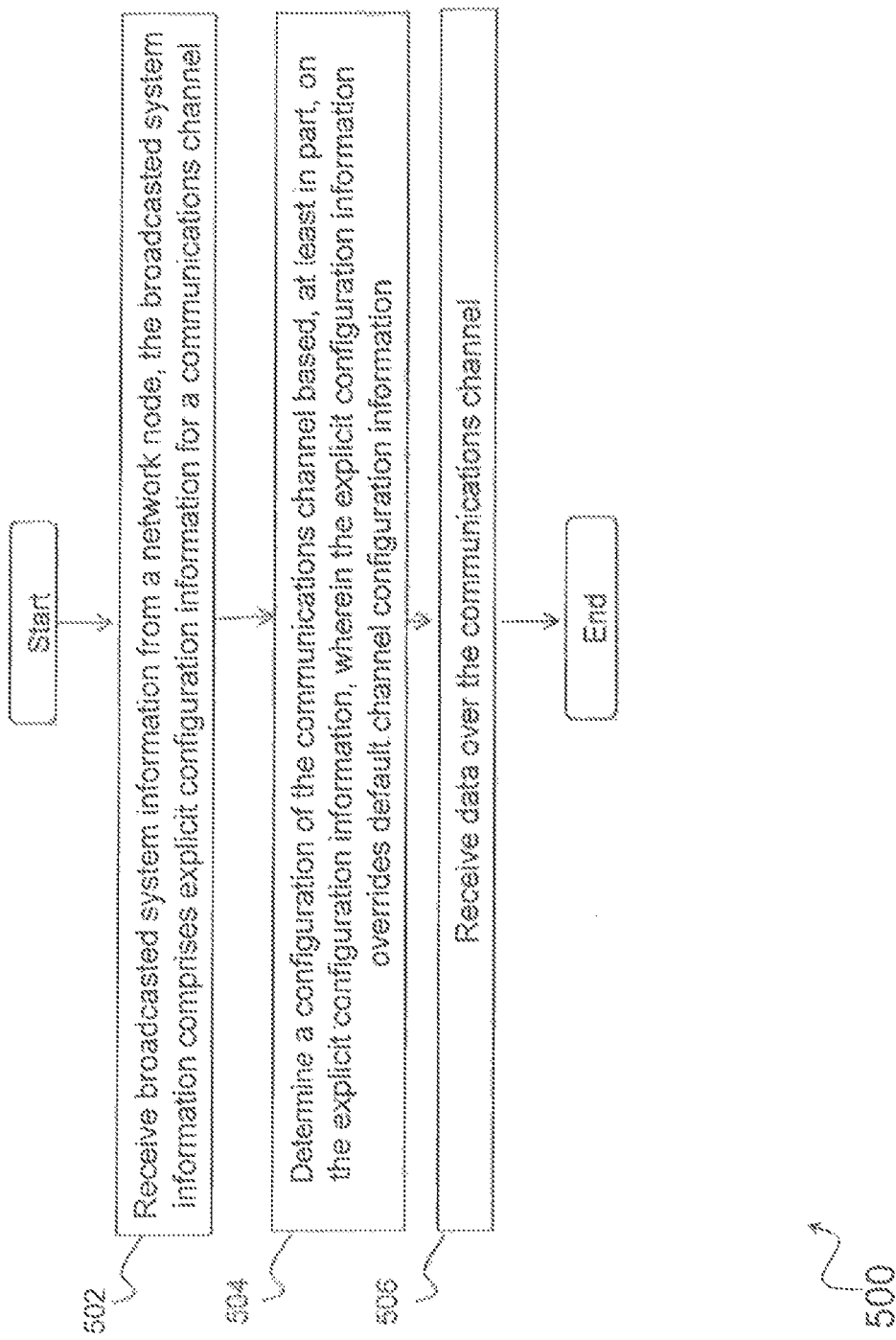
FIG. 5 is a flow chart illustrating an example method in a wireless device for determining configuration information for one or more physical control channel(s), in accordance with certain embodiments.
Figure 6:
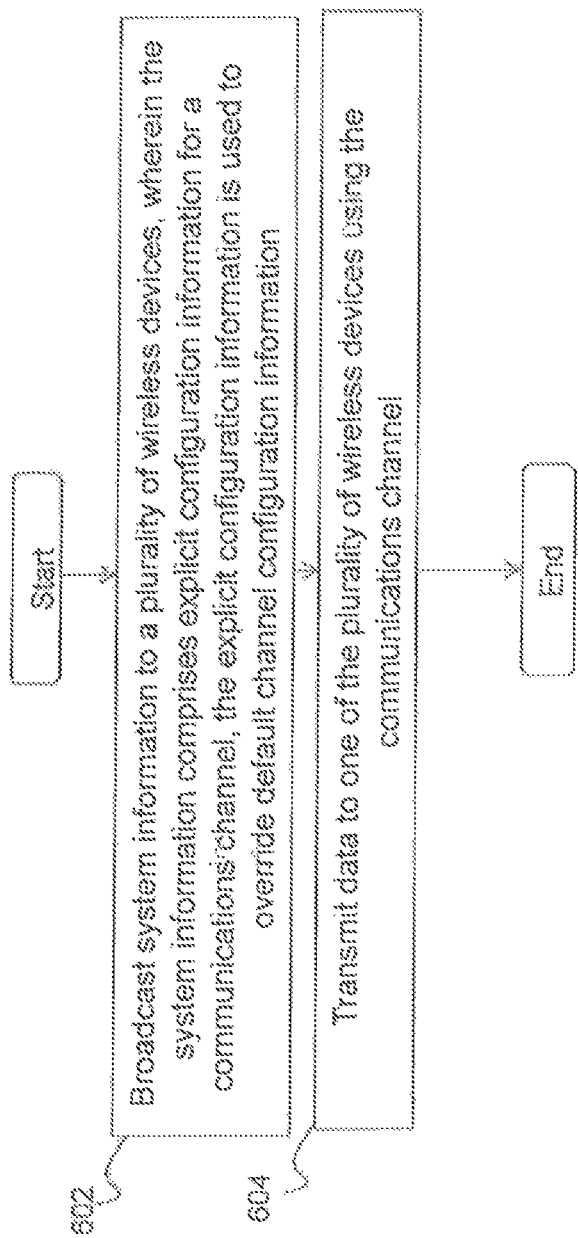
FIG. 6 is a flow chart illustrating an example method in a network node for providing configuration information for one or more physical control channel(s), in accordance with certain embodiments.

Although several of the foregoing embodiments have been described in relation to paging, the physical control channel may be used for any suitable data (e.g., control signaling information). Non-limiting examples of such data include, random access response and/or delivery of on-demand SI (i.e. other SI) triggered/requested by a UE in idle or inactive mode (e.g. RRC IDLE or RRC INACTIVE state in NR). FIGS. 5 and 6 provide additional detail regarding methods of performing embodiments of the present disclosure.

FIG. 5 is a flow chart illustrating an example method 500 in a wireless device 210 for determining configuration information for one or more physical control channel(s), in accordance with certain embodiments. In the illustrated embodiment, the method begins at step 502, wherein wireless device 210 receives broadcasted system information from network node 200. In some embodiments, the broadcasted system information comprises explicit configuration information for a communications channel. In certain embodiments, the communications channel may be a physical control channel such as the NR-PDCCH discussed above or a control channel pair like the NR-PDCCH/NR-PDSCH discussed above. The configuration information may include any suitable information sufficient for the wireless device 210 to configure a communications channel. For instance, the configuration information may comprise one or more of: downlink transmission resources; a demodulation reference signal (DMRS) sequence; a synchronization signal sequence; and/or a communications channel search space definition.

At step 504, the wireless device 210 may determine a new configuration of the communications channel based, at least in part, on the explicit configuration information. The explicit configuration information may override default channel configuration information. For example, in some embodiments, wireless device 210 may have derived a default channel configuration from one or more other signals, such as the PSS/SSS (i.e., the PCI). Wireless device 210 may override the default channel configuration information with the explicit configuration information. At step 506, the wireless device may receive data over the communication channel.

FIG. 6 is a flow chart illustrating an example method 600 in a network node 200 for providing configuration information for one or more physical control channel(s), in accordance with certain embodiments. In the illustrated embodiment, the method begins at step 602, wherein the network node 200 broadcasts system information to a plurality of wireless devices 210, wherein the system information comprises explicit configuration information for a communications channel. In some embodiments, the explicit configuration information is used to override default channel configuration information used by the wireless device 210. At step 604, the network node 200 may transmit data to one of the plurality of wireless devices 210 using the communications channel. In certain embodiments, the data may be transmitted to the wireless device 210 using any one of the following non-limiting methods: a single omnidirectional or sector beam transmission; repeated omnidirectional or sector beam transmissions; a sweeping of narrow beam transmissions; and a single frequency network transmission. In certain embodiments, the communications channel may be a physical control channel.

Figure 7:
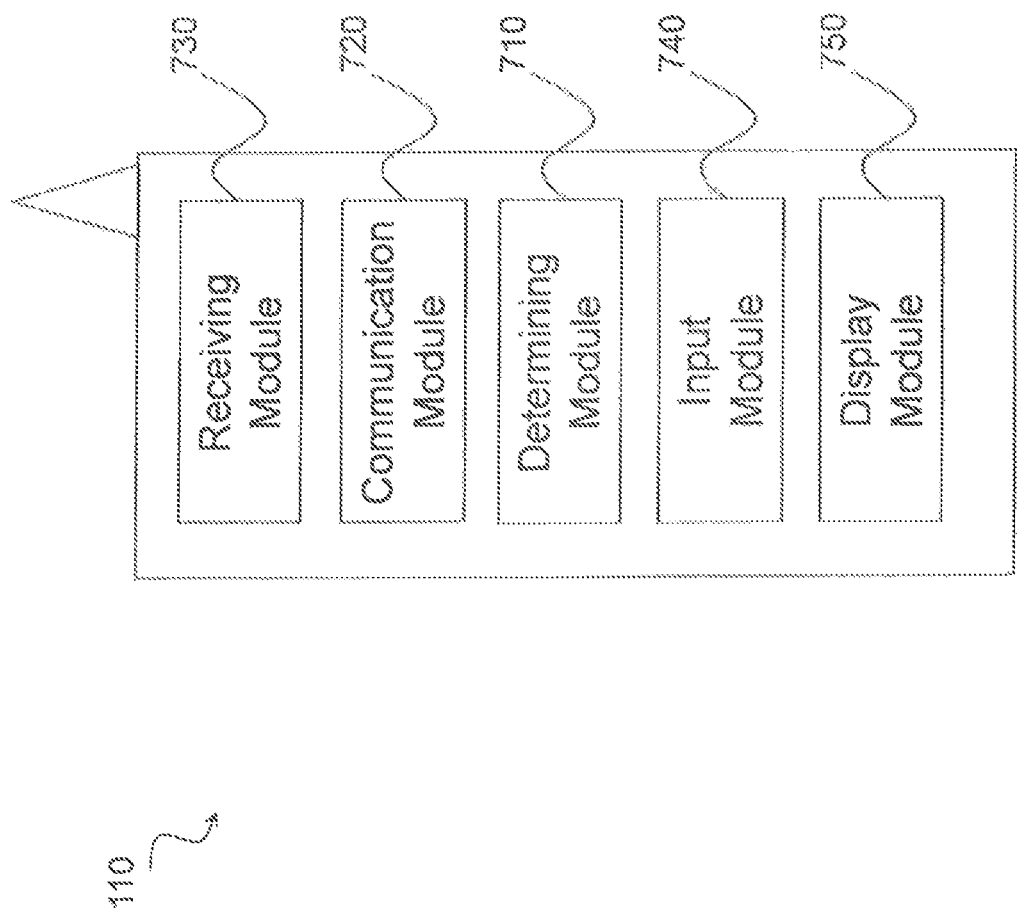
FIG. 7 is a schematic block diagram of an exemplary wireless device, in accordance with certain embodiments.

FIG. 7 is a schematic block diagram of an exemplary wireless device 210, in accordance with certain embodiments. Wireless device 210 may include one or more modules. For example, wireless device 210 may include a determining module 710, a communication module 720, and a receiving module 730. Optionally, wireless device 210 may include an input module 740, a display module 750, and any other suitable modules. Wireless device 210 may perform explicit configuration of a physical control channel as described above with respect to FIGS. 1-6.

Determining module 710 may perform the processing functions of wireless device 210. In certain embodiments, wireless device 210 may perform any of the functions described above with respect to FIGS. 1-6. In one example embodiment, determining module 710 may determine a configuration of the physical control channel based, at least in part, on the explicit configuration information. In some embodiments, the explicit configuration information may override default channel configuration information. For example, in some embodiments, wireless device 210 may have derived a default channel configuration from one or more other signals, such as the PSS/SSS (i.e., the PCI). Determining module 710 may override the default channel configuration information with the explicit configuration information.

Determining module 710 may include or be included in one or more processors, such as processor 212 described above in relation to FIG. 3. Determining module 710 may include analog and/or digital circuitry configured to perform any of the functions of determining module 710 and/or processor 212 described above. The functions of determining module 710 described above may, in certain embodiments, be performed in one or more distinct modules.

Communication module 720 may perform the communication functions of wireless device 210. In certain embodiments, communication module 720 may perform any of the communication functions described above with respect to FIGS. 1-6. Communication module 720 may transmit messages to one or more of network nodes 200 of the wireless network described in FIG. 3. Communication module 720 may include a transmitter and/or a transceiver, such as interface 201 and/or antenna 104 described above in relation to FIG. 3. Communication module 720 may include circuitry configured to wirelessly transmit messages and/or signals. In particular embodiments, communication module 720 may receive messages and/or signals for transmission from determining module 710. In certain embodiments, the functions of communication module 720 described above may be performed in one or more distinct modules.

Receiving module 730 may perform the receiving functions of wireless device 210. In certain embodiments, receiving module 730 may perform any of the receiving functions of wireless device 210 described above with respect to FIGS. 1-6. In one example embodiment, receiving module 730 may receive system information from a network node, the system information may comprise explicit configuration information for a communications channel (e.g., a physical control channel). In some embodiments, the received system information may be broadcast to the receiving module. In certain embodiments, the receiving module 730 may then receive data over the communications channel once the configuration of the channel is determined.

Receiving module 730 may include a receiver and/or a transceiver, such as interface 211 and/or antenna 211a described above in relation to FIG. 3. Receiving module 730 may include circuitry configured to wirelessly receive messages and/or signals. In particular embodiments, receiving module 730 may communicate received messages and/or signals to determining module 710.

Optionally, wireless device 210 may include input module 740. Input module 740 may receive user input intended for wireless device 210. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 710.

Optionally, wireless device 210 may include display module 750. Display module 750 may present signals on a display of wireless device 210. Display module 750 may include the display and/or any appropriate circuitry and hardware configured to present signals on the display. Display module 750 may receive signals to present on the display from determining module 710.

Determining module 710, communication module 720, receiving module 730, input module 740, and display module 750 may include any suitable configuration of hardware and/or software. Wireless device 210 may include additional modules beyond those shown in FIG. 7 that may be responsible for providing any suitable functionality, including any of the functionality described above and/or any additional functionality (including any functionality necessary to support the various solutions described herein).

FIG. 8 is a block schematic of an exemplary network node 200, in accordance with certain embodiments. Network node 200 may include one or more modules. For example, network node 200 may include determining module 810, communication module 820, receiving module 830, and any other suitable modules. In some embodiments, one or more of determining module 810, communication module 820, receiving module 830, or any other suitable module may be implemented using one or more processors, such as processor 202 described above in relation to FIG. 3. In certain embodiments, the functions of two or more of the various modules may be combined into a single module. Network node 200 may perform one or more steps associated with explicit configuration of a physical control channel as described above in reference to FIGS. 1-6.

Determining module 810 may perform the processing functions of network node 200. In certain embodiments, determining module 810 may perform any of the functions of network node described above with respect to FIGS. 1-6. In one example embodiment, determining module 810 may determine a communications channel (e.g., a configuration of the communications channel) for delivering data to a plurality of user equipments (UEs)

Determining module 810 may include or be included in one or more processors, such as processor 102 described above in relation to FIG. 3. Determining module 810 may include analog and/or digital circuitry configured to perform any of the functions of determining module 810 and/or processor 202 described above. The functions of determining module 810 may, in certain embodiments, be performed in one or more distinct modules. For example, in certain embodiments some of the functionality of determining module 810 may be performed by an allocation module.

Communication module 820 may perform the transmission functions of network node 200. In certain embodiments, network node 200 may perform any of the functions of the node described above with respect to FIGS. 1-6. In one example embodiment, communication module 820 may transmit (e.g., broadcast) system information to a plurality of wireless devices, wherein the system information comprises explicit configuration information for a communications channel. In some embodiments, the communications module 820 may transmit data to one of the plurality of wireless devices using the communications channel (e.g., a physical control channel).

Communication module 820 may transmit messages to one or more of wireless devices 110. Communication module 820 may include a transmitter and/or a transceiver, such as transmitter 201 described above in relation to FIG. 3. Communication module 820 may include circuitry configured to wirelessly transmit messages and/or signals. In particular embodiments, communication module 820 may receive messages and/or signals for transmission from determining module 810 or any other module.

Receiving module 830 may perform the receiving functions of network node 200. In certain embodiments, receiving module 830 may perform any of the functions of network node 200 described in FIGS. 1-6. Receiving module 830 may include a receiver and/or a transceiver, such as interface 201 and/or antenna 104, which are described above in relation to FIG. 3. Receiving module 830 may include circuitry configured to wirelessly receive messages and/or signals. In particular embodiments, receiving module 830 may communicate received messages and/or signals to determining module 810 or any other suitable module.

Determining module 810, communication module 820, and receiving module 830 may include any suitable configuration of hardware and/or software. Network node 200 may include additional modules beyond those shown in FIG. 8 that may be responsible for providing any suitable functionality, including any of the functionality described above and/or any additional functionality (including any functionality necessary to support the various embodiments described herein).

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

| Abbreviation | Description |
| --- | --- |
| 3GPP | 3rd Generation Partnership Project |
| 5G | 5th Generation |
| C-RAN | Centralized RAN |
| CRS | Cell-specific Reference Signal |
| DCI | Downlink Control Information |
| DL | Downlink |
| DMRS | Demodulation Reference Signal |
| DRX | Discontinuous Reception |
| gNB | gNodeB - a radio base station in NR |
| LTE | Long Term Evolution |
| MIB | Master Information Block |
| NR | New Radio |
| OFDM | Orthogonal Frequency Division Multiplex |
| PBCH | Physical Broadcast Channel |
| PCFICH | Physical Control Format Indicator Channel |
| PCI | Physical Cell Identity |
| PDCCH | Physical Downlink Control Channel |
| PDSCH | Physical Downlink Shared Channel |
| PRACH | Physical Random Access Channel |
| PSS | Primary Synchronization Signal |
| RAN | Radio Access Network |
| RAR | Random Access Response |
| RNTI | Radio Network Temporary Identifier |
| RRC | Radio Resource Control |
| SFN | Single Frequency Network |
| SI | System Information |
| SIB | System Information Block |
| SS | Synchronization Signal |
| SSS | Secondary Synchronization Signal |
| TRP | Transmission/Reception Point |
| UE | User Equipment |

The invention claimed is:

1. A method in a network node, comprising:
broadcasting system information to a plurality of user equipments (UEs), wherein the system information comprises explicit configuration information for a communications channel, wherein the explicit configuration information is provided in a master information block (MIB) and wherein the communications channel is a physical control channel, wherein the explicit configuration information overrides default channel configuration information; and
transmitting data to one of the plurality of UEs using the communications channel.

2. A network node, comprising:
processing circuitry configured to determine a communications channel for delivering data to a plurality of user equipments (UEs);
an interface operably coupled to the processing circuitry, the interface configured to:
broadcast system information to the plurality of UEs, wherein the system information comprises explicit configuration information for the communications channel, wherein the explicit configuration information is provided in a master information block (MIB) and wherein the communications channel is a physical control channel, wherein the explicit configuration information is used to override default channel configuration information; and
transmit the data to one of the plurality of UEs using the communications channel.

3. The network node of claim 2, wherein the explicit configuration information comprises one or more indication(s) of downlink transmission resources.

4. The network node of claim 2, wherein the explicit configuration information comprises an indication of a demodulation reference signal (DMRS) sequence.

5. The network node of claim 2, wherein the explicit configuration information comprises one or more indication(s) of one or more synchronization signal sequence(s).

6. The network node of claim 2, wherein the explicit configuration information comprises an indication of a communications channel search space definition.

7. The network node of claim 2, wherein the explicit configuration information comprises an indication of a cyclic prefix length.

8. The network node of claim 2, wherein the data is transmitted to the one of the plurality of UEs using at least one of:
a single omnidirectional or sector beam transmission;
repeated omnidirectional or sector beam transmissions
a sweeping of narrow beam transmissions; and
a single frequency network transmission.

9. A method in a user equipment, comprising:
receiving broadcasted system information from a network node, the broadcasted system information comprising explicit configuration information for a communications channel, wherein the explicit configuration information is received in a master information block (MIB) and wherein the communications channel is a physical control channel;
determining a new configuration of the communications channel based, at least in part, on the explicit configuration information, wherein the explicit configuration information overrides default channel configuration information; and
receiving data over the communications channel.

10. The method of claim 9, wherein the UE is in an idle or inactive mode, and the received data is paging messaging.

11. The method of claim 9, wherein the UE is in an idle or inactive mode, and the received data is on-demand system information.

12. The method of claim 9, wherein the explicit configuration information comprises one or more indication(s) of downlink transmission resources.

13. A user equipment (UE), comprising:
an interface configured to receive broadcasted system information from a network node, the broadcast system information comprising explicit configuration information for a communications channel, wherein the explicit configuration information is received in a master information block (MIB) and wherein the communications channel is a physical control channel;
processing circuitry operably coupled to the interface, the processing circuitry configured to:
determine a configuration of the communications channel based, at least in part, on the explicit configuration information, wherein the explicit configuration information overrides default channel configuration information; and
the interface further configured to receive data over the communications channel.

14. The UE of claim 13, wherein the UE is in an idle or inactive mode, and the received data is paging messaging.

15. The UE of claim 13, wherein the UE is in an idle or inactive mode, and the received data is on demand system information.

16. The UE of claim 13, wherein the explicit configuration information comprises one or more indication(s) of downlink transmission resources.

17. The UE of claim 13, wherein the explicit configuration information comprises an indication of a demodulation reference signal (DMRS) sequence.

18. The UE of claim 13, wherein the explicit configuration information comprises one or more indication(s) of one or more synchronization signal sequence(s).

19. The UE of claim 13, wherein the explicit configuration information comprises an indication of a communications channel search space definition.

20. The UE of claim 13, wherein the explicit configuration information comprises an indication of a cyclic prefix length.

* * * * *